(No Model.)

A. EWING.
WAGON BODY.

No. 494,133. Patented Mar. 28, 1893.

Witnesses
Albert Speiden
Van Buren Hillyard.

Inventor
Andrew Ewing.
By his Attorneys
R.S. & A.P. Lacey

UNITED STATES PATENT OFFICE.

ANDREW EWING, OF ASBURY PARK, NEW JERSEY.

WAGON-BODY.

SPECIFICATION forming part of Letters Patent No. 494,133, dated March 28, 1893.

Application filed June 3, 1892. Serial No. 435,395. (No model.)

*To all whom it may concern:*

Be it known that I, ANDREW EWING, a citizen of the United States, residing at Asbury Park, in the county of Monmouth, State of New Jersey, have invented certain new and useful Improvements in Wagons; and I do hereby declare the following to be a full, clear, and exact description of the invention, such as will enable others skilled in the art to which it appertains to make and use the same.

This invention relates to vehicles which are essentially closed and have doors on the sides opposite the space between the front and rear wheels.

The purpose of the invention is to facilitate the turning of this class of vehicles in a small space and at the same time obtain a maximum amount of storage room.

The improvement consists principally, in indentation in the opposite edges of the wagon bed corresponding with the position of the doors to obtain clearance space for the front wheels when turning the wagon.

The improvement also consists in a door composed of sections which are hinged together at their meeting edges, and which are so mounted that the said sections will adapt themselves to the form of the said indentations in the wagon bed, and will lie parallel with the sides of the wagon and be adapted to slide to either side of the said opening.

Figure 1:
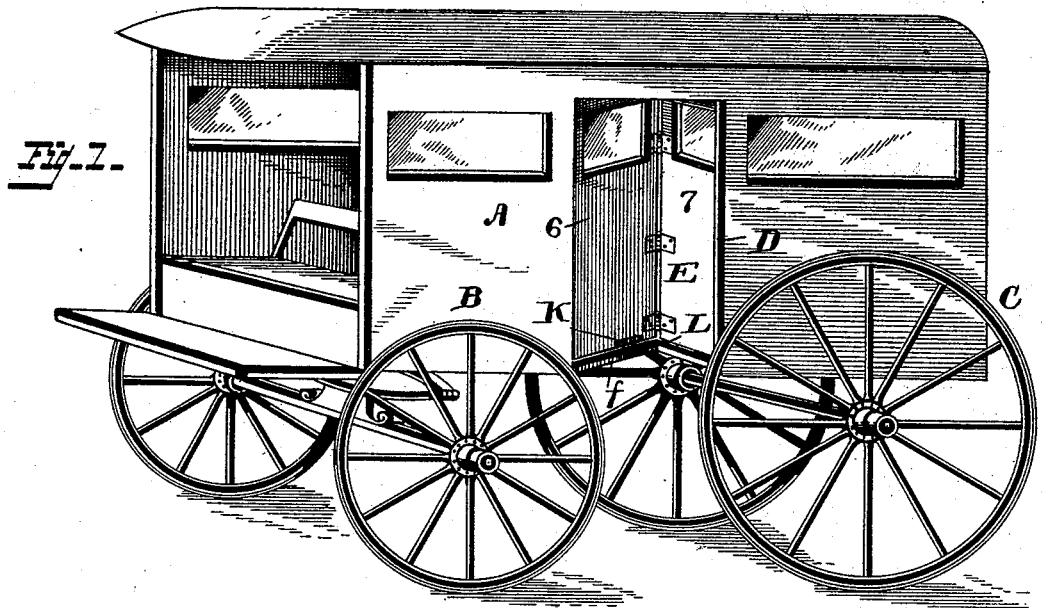
Figure 2:
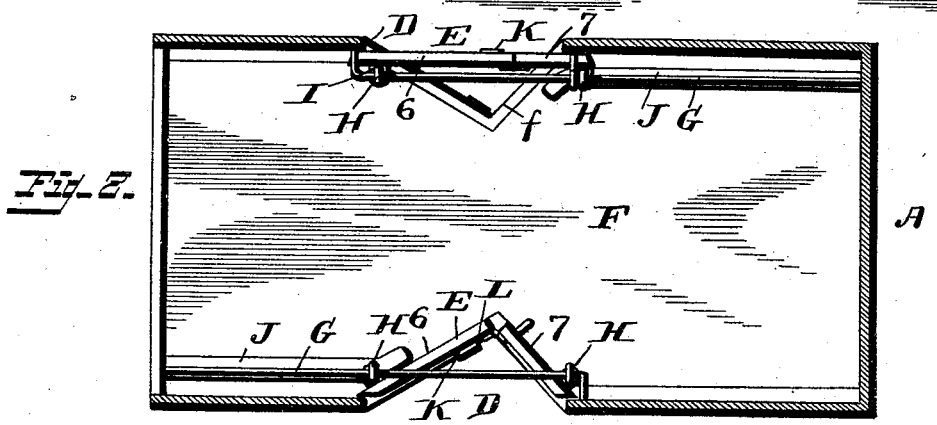
Figures 3, 4:
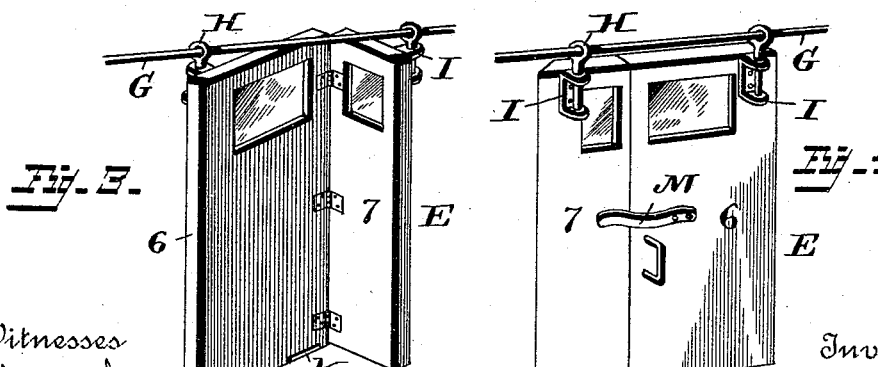

The improvement further consists in the novel features and the peculiar construction and combination of the parts which will be hereinafter more fully described and which are shown in the annexed drawings, in which Figure 1 is a perspective view of a vehicle embodying my invention. Fig. 2 is a top plan view of the vehicle body the top being removed to show the relative arrangement of the several parts. Fig. 3 is a detail view of one of the doors showing the disposition of the composed sections when the latter are conformed to the outline of the indentation in the wagon bed. Fig. 4 is a view similar to Fig. 3 showing the component sections of the door in the same plane.

The wagon body A which may be of any approved form of construction, is mounted in the usual manner on the front and rear wheels B and C, respectively, and is provided in its sides at a point opposite the space between the said wheels B and C with openings D which are closed by doors E.

The bed F of the wagon is provided in its opposite edges with indentations *f* which correspond with the position of the openings D. These indentations are properly re-inforced by iron plates to obtain the requisite degree of strength necessary in a vehicle of this class. These indentations approximate the form of an inverted V, the sides flaring outward and are designed to give clearance for the wheels B when it is desired to make a short turn.

The doors E, one for each opening D, are composed of sections 6 and 7 which are hinged together at their meeting edges, and which are constructed to slide to either side of the opening D. To admit of the sections 6 and 7 conforming to the sides of the indentations *f* it has been found necessary to support the said sections at their outer ends and in such a manner as to permit of the hinged edges of the said sections swinging inward. To mount the doors so as to effect this result in an economical manner, the mountings, shown most clearly in Figs. 3 and 4 have been devised. The rod G at the top of the vehicle and parallel with the side thereof, forms a support for the door which is suspended therefrom by suitable eye bolts H which are mounted in brackets I that are attached to the door sections 6 and 7 at their outer ends. These eye bolts H are adapted to turn in the brackets I thereby permitting the sections to swing inward at their hinged or meeting edges. A suitable stop will be provided to limit the inward movement of the said door sections when the same has properly conformed to the outline of the indentations *f*. This stop is preferably at the outer end of a guard rail J which is provided on the bed of the wagon to hold the said sections close to the side of the wagon when the door is opened and prevent the same swinging inward at its lower edge. One of the door sections, as 7, will be provided with a rub iron K and the wagon bed F will be provided with corresponding rub iron L at the inner end of the indentation *f*. On making a short turn the inner wheel B will engage with the rub irons K and L and prevent injury to the wagon body and the doors.

It will be understood that the rods G may be arranged on either side of the openings D so that the doors may be slid either to the front or to the rear of the wagon as may be found most convenient. Both forms are shown in Fig. 2.

It is not essential that the door sections conform to the indentations $f$ at all times, but only when it is desired to make short turns. In some cases I propose to have the door sections remain in the same plane and parallel with the sides of the wagon, and provide a spring M to yieldingly hold the said sections in this position. Obviously, when the doors are closed and it is desired to make a short turn the inner of the front wheels will engage with the rub iron K and press the meeting edges of the said door sections inward against the tension of the said spring M and after the turn has been made, the spring M re-acting will return the door sections to their normal positions, as will be readily understood.

Having thus described my invention, what I claim, and desire to secure by Letters Patent, is—

1. The combination with a vehicle body having indentations in the opposite edges of the bed, of a door composed of sections which are hinged together at their meeting edges, which door is constructed to lie close to the side of the vehicle body when opened, and which is adapted to conform to the sides of the said indentations when closed, substantially as and for the purpose described.

2. The combination with a vehicle body having openings in its sides, of doors to close the said openings, composed of sections which are hinged together at their meeting edges and which are supported at their outer edges, whereby the said sections are adapted to swing inward at their meeting or hinged edges, substantially as and for the purpose specified.

3. The combination with a vehicle body having openings in its sides, and having indentations in the opposite edges of the bed corresponding with the position of the said opening, and doors to close the said openings composed of sections which are hinged together at their meeting edges, of a rod supported above each opening, brackets provided at the outer end of the door sections, and eye bolts mounted in the said brackets and adapted to slide on the said rods substantially as and for the purpose described.

4. The combination with a vehicle body having indentations in its opposite sides, and a door suspended at its upper end and composed of sections which are hinged together at their meeting edges, of a guard rail secured to the bed of the wagon and having its outer end conformed to the side of the said indentations, substantially as and for the purpose set forth.

In testimony whereof I affix my signature in presence of two witnesses.

ANDREW EWING.

Witnesses:
WILLIAM A. N. EMMONS,
ADAM SMITH.